(12) United States Patent
Gonyer et al.

(10) Patent No.: US 8,461,724 B2
(45) Date of Patent: Jun. 11, 2013

(54) UNIVERSAL CONTROL SYSTEM WITH UNIVERSAL INTERFACE TO OPERATE A PLURALITY OF DEVICES

(75) Inventors: Kyle James Gonyer, Petersburg, MI (US); Neal F. Harris, Los Angeles, CA (US)

(73) Assignees: Live-FX, LLC, Petersburg, MI (US); SE Associates, LLC, Inglewood, CA (US)

( * ) Notice: Subject to any disclaimer, the term of this patent is extended or adjusted under 35 U.S.C. 154(b) by 270 days.

(21) Appl. No.: 12/804,060

(22) Filed: Jul. 13, 2010

(65) Prior Publication Data

US 2011/0022243 A1   Jan. 27, 2011

Related U.S. Application Data

(60) Provisional application No. 61/228,794, filed on Jul. 27, 2009.

(51) Int. Cl.
| | |
|---|---|
| *H01H 31/10* | (2006.01) |
| *H01H 33/59* | (2006.01) |
| *H01H 47/00* | (2006.01) |
| *H01H 85/46* | (2006.01) |
| *H01H 19/14* | (2006.01) |

(52) U.S. Cl.
USPC .................................... 307/115; 307/64

(58) Field of Classification Search
USPC ............................... 307/115, 40, 64
See application file for complete search history.

(56) References Cited

U.S. PATENT DOCUMENTS

| | | | |
|---|---|---|---|
| 2006/0273741 A1* | 12/2006 | Stalker, III | 315/291 |
| 2008/0164854 A1* | 7/2008 | Lys | 323/226 |

* cited by examiner

*Primary Examiner* — Carlos Amaya
(74) *Attorney, Agent, or Firm* — Paul M. Denk

(57) ABSTRACT

This invention pertains to a controlling device for operating various appliances. It includes a personal computer, which is programmed to provide for regulation of the sequence of operations of various electrical devices, such as a controller, the controller functions to initiate or turn OFF a relay or switching electronics device, which can provide for the operations of an appliance, whether it be an industrial or household appliance, or appliances that are used specifically in the entertainment field, such as a scent emitting device, a dimmer, a misting mechanism, and a vibratory motor. These are examples.

7 Claims, 3 Drawing Sheets

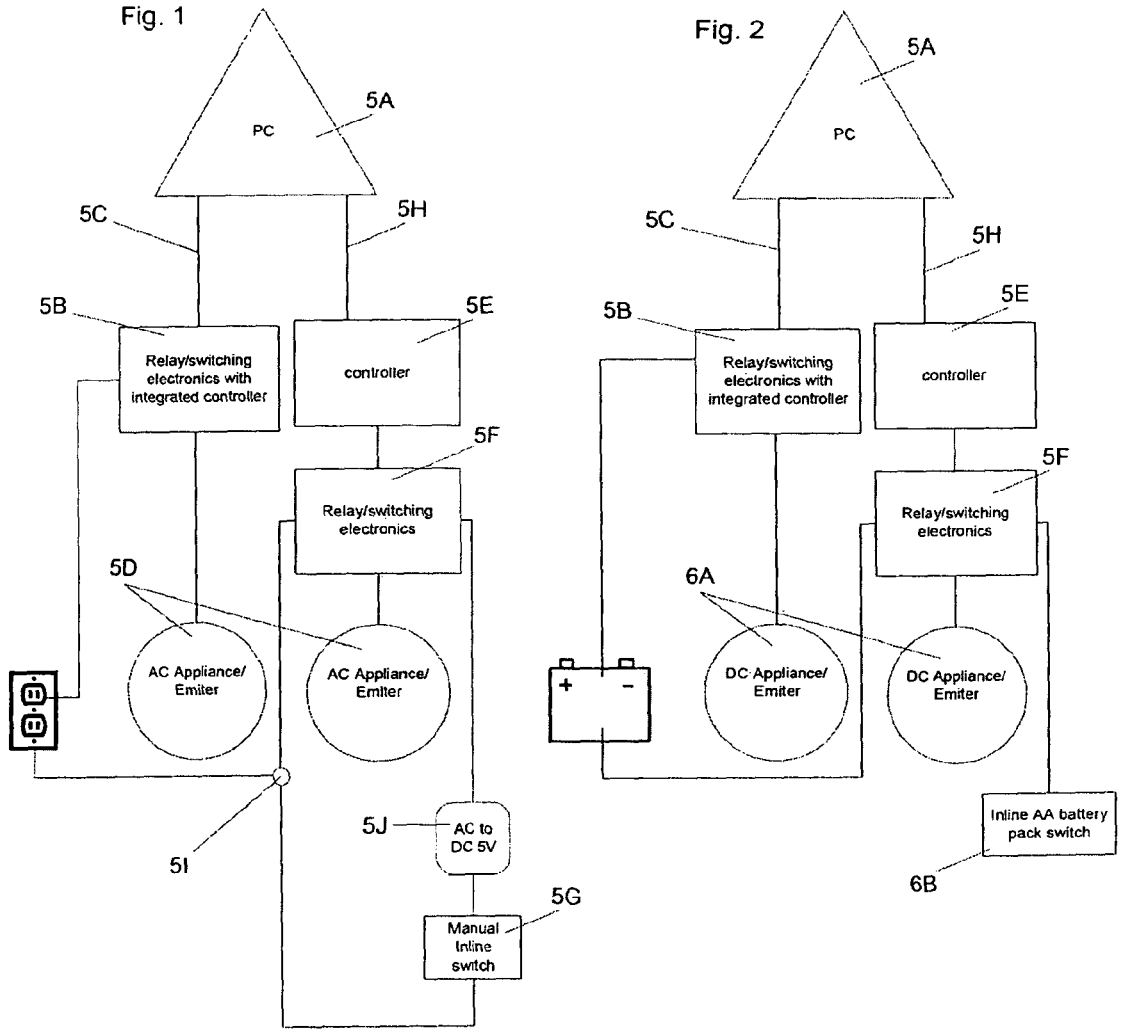

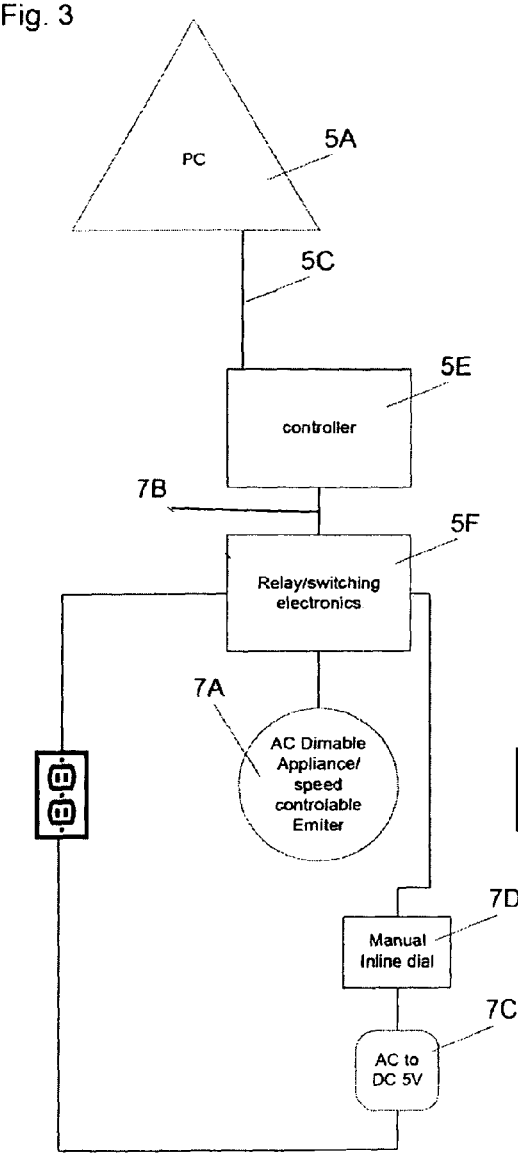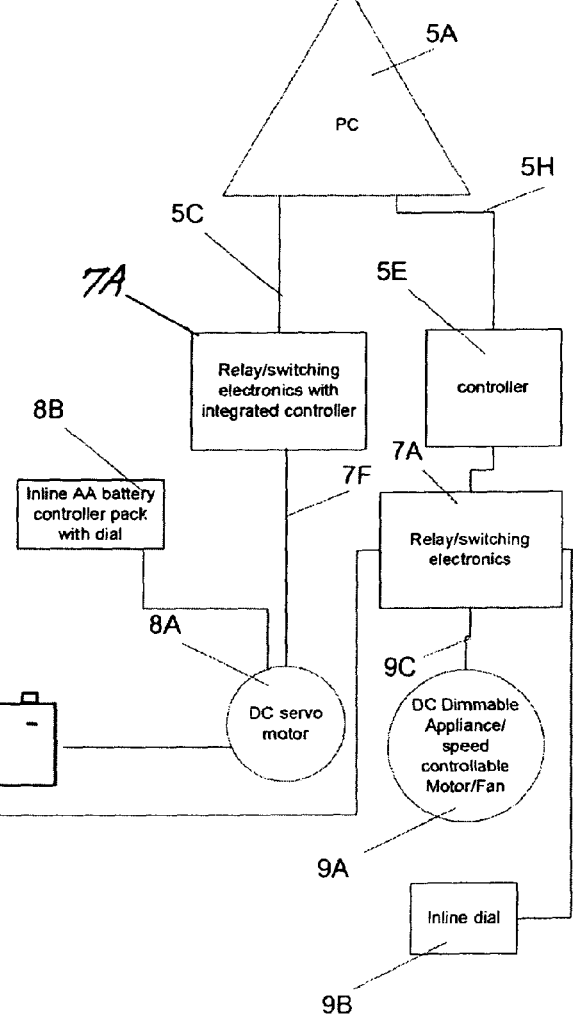

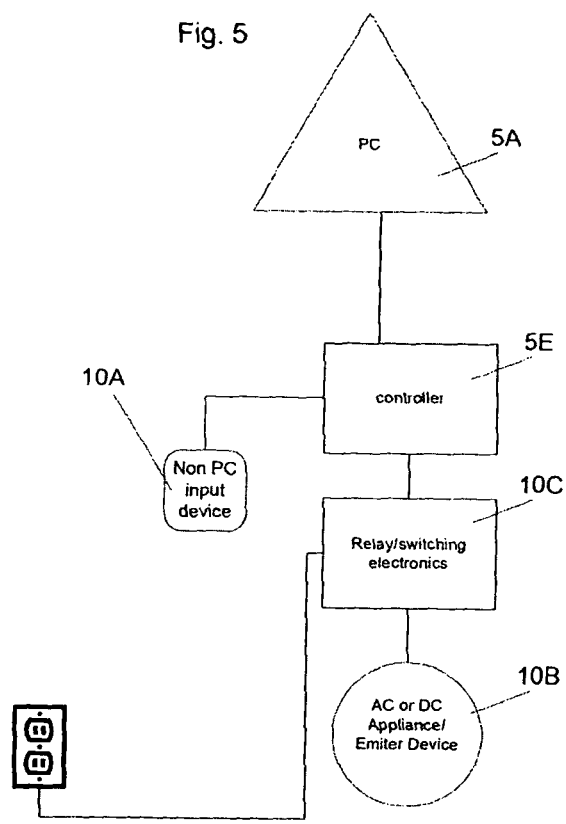

UNIVERSAL CONTROL SYSTEM WITH UNIVERSAL INTERFACE TO OPERATE A PLURALITY OF DEVICES

CROSS REFERENCE TO RELATED APPLICATION

This non provisional patent application claims priority to the provisional patent application having Ser. No. 61/228,794, having filing date Jul. 27, 2009.

FIELD OF THE INVENTION

Live performances, presentations or entertainment media typically utilize proprietary systems for the control of effects rendered from emitting type hardware. Such hardware may include lights, mist, fog, fans and scent distribution. This scenario also uses propriety cables and emitter type hardware that can only be used with said controllers.

In order to achieve a universal system between controller and emitter, the invention incorporates a universal method for the control of on/off and in some instances the adjustment of speed/position, etc. of a rendering/emitting device. Pluralities of electronic AC/DC appliances/devices are supported allowing this system to be used for numerous other uses not possible with proprietary systems. Uses range from device automation to collaboration with presentation and entertainment media.

BACKGROUND OF THE INVENTION

The invention provides in one aspect, an automation/operator control system for generating the required signals required for controlling the system described below:
The invention is a system that is comprised of:
A 4-6V electronic control/relay board wired to standard Edison style outlets, of which accepts the widest range of connection to external emitting device that are powered by AC. An AC to DC adapter cable allows for DC connection from the same universal outlet (provided that the DC connection is made with RCA (composite) male plugs connectors.) All controller/relay electronics support both AC and DC power.
A housing for such electronics that incorporate a standard IED power chord jack for accepting AC input from the widely universal IED female AC power chords.
A housing that accepts DC control signal input from the housing top using standard female video jacks. Controller boards not integrated with the relay electronics accomplish the transport of the DC signal through such mentioned method using universal video cables—RCA type for 2 line needs, S-video for 3-4 line needs.
A housing that utilizes both of the outlets on a standard duel Edison plug in a manner that each plug is a separate controllable channel.
A method in which the controller (integrated or separate from the relay/switching electronics) can be controlled via standard 5V USB signal through a PC.
A method, (for when using a relay/switching electronics) in which the controller can be unplugged from a PC and alternately operated manually via 5V signal from battery pack or any $3^{rd}$ party controller cable of a "universal" 5V signal.
A housing that consists of input plugs utilizing the same video cable standard of RCA (composite) or S-video. Inputs can be used to trigger outputs from an external source via the universal 5V DC standard. In this method the input directly correlates to the output signal in such a way that a motion director or pressure mat can trigger or channel or even multiple channels vs. the traditional methods.
A method to power such relays/switching electronics without the presence of a 5V signal from PC (generally provided through the USB). Using the universal RCA (composite) connection, such relay/switching electronics can be powered by 4-6V alkaline batteries or an AC to 5V DC wall adapter for continuous power needs. This applies to relays/switching electronics that are not integrated with a built in USB controller.
A connector that allows the use of standard speaker wire to make RCA (composite) plug connections.
A housing that uses color coding of the video input jacks too simply and eliminate confusion as to proper connection.
A permanent connection for USB cables to all relays/switching electronics that do incorporate a built-in controller. This method eliminates lost cables and weakening or internal USB jacks from continuous plugging and unplugging as such USB connections.
A system consisting of a plurality of PC software applications that can alternately be used to control the system beyond the limitations of manual triggering. To include but not limited to:
 1. Wireless signal triggering
 2. Synced triggering from entertain media (or user timed)
 3. Manually hardwired triggering from PC input devices (mouse, joystick, motion sensor)
A modular system including hardware in which a user can set up a to be configured in a manually controlled environment and later (or in the same session) move to a PC controlled system while still maintaining the same relays/switching electronics.
A system that will allow interface with various existing control systems such as DMX and X-10 or any others utilizing a servo or 5V signal.
A system that has the ability to connect directly to a battery and run DC devices without the needs of an AC system (mobile, emergency backup, off-the grid etc.)
A system that has the ability to connect up to 127 USB controllers per PC. The number of channels would be depending on the configuration, but could yield as many as 1016 channels from a single PC.

In prior instances such electronic relay/controller boards and/or relay or switch boxes require the user to assemble, solder and/or create a custom configuration for such a system to be together in one complete unit. Prior art is not considered a "turn-key solution" due to having no set standard as to how connections would be made and/or taken to produce a universal complete system. In any prior custom system, a clip or screw type connections would be used to make connections between components. Such connections generally make it harder to produce such a universal system because bare wire must be used vs. a clean connection using standard type plug connectors mentioned prior in the section above. In addition to claims made in Background of Invention, the following additionally set the invention apart from other systems.

Prior art systems are comprised of the following limitations:
An electronic control board wired to standard Edison outlets in a "tandem" connection where each duel outlet can handle only one channel.

Housing for such electronics that incorporate a standard IED power chord without a separate jack for accepting various brands and lengths or detachable IED AC power chords.

A system that only uses proprietary signal cables and connectors directly related to the manufacturer's brand or protocol of per se system. Such systems also employ integrated jacks for mentioned cables into the emitting devices rendering them in-portable (non-universal) with any system not belonging to the same brand, manufacturer or signal transmission protocol.

A system with no color coding for connection ports.

Software that is proprietary and does not lend itself to integration with entertainment type media.

A controller or PC application controller that does not utilize any other PC input devices for controller other than mouse, keyboard or integrated levers from a stand alone controller.

A system that generally supports only on/off and variable power (dimming) of AC lights. DC devices, motor position and speed control or motors are not generally available. Manual triggering of signals are also not generally supported.

SUMMARY OF THE INVENTION

The concept of this invention is to provide a controller that operates in conjunction with a personal computer, and which may be programmed to provide for a sequence of operations of various components, either in the ON/OFF mode, or to provide for regulative control of the intensity of operations of an appliance, through the personal computer. For example, as previously reviewed, it may be desirable to control various types of appliances, or hardware, such as lights, mister, foggers, fans, scent distribution devices, and to do so through the programmed personal computer "PC", which will regulate a relay switching devices, for initiating a controller, which will then provide for regulation of the identified appliance, as just explained, in its functioning and operations. This may be done and used in the entertainment field, such as with the conduct of concerts by a band, or singing group, or it may be used for a variety of other services, or even with the performance of games, such as videogames, to provide for a more precise and additional control of the operations of the game, and its performance, during usage. Such controls may be used to regulate misters, dimmers, scent emitting devices, or even vibrations generated from a vibratory motor, that may be used within a performance. In addition, the concept of this invention may include the application of the controller to various appliances, to provide for their turn ON, or turn OFF, or for the intensity of their operations, or length of time of performance, during usage.

Essentially, the device includes generally a personal computer, which may be programmed to perform or initiate particular functions, it is in contact with a controller, which may initiate a relay or switching electronics, to provide for the initiation and operations of one of the types of appliances as previously reviewed.

The electrical source for operations of the appliance may be from a line current, or it may be supplied by a battery, and perhaps even have means for rectifying the current from AC to DC, if the appliance operates solely upon direct current. Or, where a battery may be the source of charge, the charge may be rectified into an alternating current, to operate the appliance.

Over the years, there have been many inventions and attempts made to control appliances and electronic devices, TV, VCR, lighting, fans, etc. Many of these inventions are elaborate, complicated and costly devices. Many of these devices work well but as stated upon in the prior art, require the consumer to purchase proprietary fixtures from the original manufacturer to operate the system. Such characteristic leaves the consumer no flexibility once they begin usage of the particular system.

This invention offers the end user flexibility in the design and devices they choose to use in such a way that any device plugged into a typical wall outlet can be controlled with the system. This trait offers the consumer the ability to re-use current systems while avoiding costly investment in completely new equipment. The control system allows three choices of control; manual, PC through included application and via custom programming.

The current invention seeks to overcome the above mentioned issues relating to flexibility, cost and safety, thus providing an improved interface for home, commercial and special effects application.

The principal object of this invention is to bring to market and commercialize a low cost, easy, flexible and safe method of allowing a customer to control or automate various effects for computer programs, games, advertising, promotional, film making, themed events, entertainment, etc. without the need to invest in a specialized and often expensive elaborate proprietary system.

A secondary object of this invention is to allow customers to utilize readily available "off the shelf" systems such as typical fans, misters, lights, and other special effect type equipment without investment in costly specialized equipment.

These and other objects may become more apparent to those skilled in the art upon review of the summary of the invention as provided herein, and upon undertaking a study of the description of its preferred embodiment, in view of the drawings.

DESCRIPTION OF THE DRAWINGS

For a better understanding of the present invention, and to show more clearly how it may be carried into effect, reference will now be made by way of examples to the accompanying drawings which show examples of the present invention, and in which:

FIG. 1 is a schematic flowchart illustrating the general process steps conducted by the system of the present invention when using an AC source for ON/OFF control of an AC appliance/emitter device;

FIG. 2 is a schematic flowchart illustrating the general process steps conducted by the system of the present invention when using a DC source for ON/OFF control of a SC appliance/emitter device;

FIG. 3 is a schematic flowchart illustrating the general process steps conducted by the system of the present invention when using an AC source for an AC dimmable appliance/speed controllable emitter;

FIG. 4 is a schematic flowchart illustrating the general process steps conducted by the system of the present invention when using a DC source for a DC servo motor as well as a DC dimmable appliance or speed controlled fan/motor; and FIG. 5 is a schematic flowchart illustrating the general process steps conducted by the system of the present invention when using non-PC input devices for control.

DESCRIPTION OF THE PREFERRED EMBODIMENT

Reference is first made to FIG. 1 where the PC 5A is used to directly control the on/off state of the relay/controller with switching electronics 5B via USB cable #1 5C. Power for the AC appliance/emitter 5D is provided by a standard wall outlet and passed first through the relay/controller with switching electronics 5B, where it stays in an off state till the PC gives a 5V data signal that will yield an "on" state for Appliance/Emitter 5D through the USB cable #1 5C. With this configuration, only 3 cables are required.

In the same FIG. 1 diagram, USB cable #2 5H may be also connected to a separate controller 5E and then to the relay/switching electronics 5F. This configuration would be preferred if you wanted to run longer distances than the USB transport protocol can handle or you want a backup manual trigger switch 5G.

In the event that the PC or controller fails, the relay/switching electronics 5F can still be used to control the AC appliance/emitter 5D from the manual inline trigger switch 5G. The manual trigger switch 5G can also be universally accomplished using any outlet switch like a power strip, extension chord that has an inline switch or push button to allow the AC power to continue through. An X-10 or wireless outlet module could also be used for the role of the manual inline trigger switch 5G. When an AC source is used as a backup trigger, an additional outlet would be needed or the use of a Y-splitter for the area noted at 51. It is important to note that the AC current does not directly send a trigger signal to the relay/switching electronics 5F, but rather conducts a 5V DC current that is converted by the AC to DC 5V wall adapter 5J.

Referring now to FIG. 2 the same methods of control can alternatively be used to control a DC device from a DC powered source. As with FIG. 1, the same PC 5A is used to directly control the on/off state of the relay/controller with switching electronics 5B via USB cable #1 5C. Power for the DC appliance/emitter 6A is provided by a battery with a voltage directly related to the power needs of the DC appliance/emitter 6A. Power from the battery is passed first through the relay/controller with switching electronics 5B, where it stays in an off state till the PC gives a 5V data signal through the USB cable #1 5C that will yield an "on" state.

In the same FIG. 2 diagram, USB cable #2 5H may be also connected to a separate controller 5E and then to the relay/switching electronics 5F. This configuration would be preferred if you wanted to run longer distances than the USB transport protocol can handle or you want a backup manual DC battery trigger switch 6B. In this example, the PC 5A connects to controller 5E via USB cable #2 5H. Power for the DC Appliance/Emitter 6A is connected to the relay/switching electronics 5F from the battery.

As before, the relay switch 5F connects to the DC Appliance/Emitter 6A, only allowing an on/off state when the controller and PC give the signal. In the event that the PC or controller fails, the relay/switching electronics 5F can still be used to control the DC appliance/emitter 6A from the manual Inline AA battery pack switch 6B.

FIG. 3 illustrates the system when used in accordance with a speed or dim controlled AC appliance. As with FIGS. 1 and 2, the same PC 5A is used to control the on/off state of the relay switching electronics 5F as shown in FIGS. 1 and 2. In this scenario, the on/off state can be between 0-100% on/off with a range of 256 steps, a signal of 128 being exactly 50% on/off. The controller 5E takes its input from the PC 5A via USB cable #1 5C.

The signal sent from the controller is sent through an s-video cable noted by 7B. The signal is a PWM signal, that is to say it is a pulsing variable voltage that makes speed/dimming control of the relay/variable switching electronics 5F possible. This signal is sent through a 4 line cable (s-video) 7B to differentiate it from the standard on/off signal which uses an (RCA/composite video cable). Power for the AC dimmable appliance/speed controllable emitter 7A is connected to the relay/switching electronics 5F from the AC power source (wall outlet).

In the event that the PC or USB Controller fails, the relay/switching electronics 5F can still be used to control the AC appliance/emitter 7A from the manual inline dial 7D. The manual inline dial 7D is connected inline with an AC to DC 5V wall adapter 7C. This allows for the AC power to be converted to 5V DC so that a 5V PWM signal can be sent to the relay/switching electronics 5F from the manual inline dial 7D instead of the PC and controller 5E. In the scenario, the AC appliance/emitter 7A can be optionally controlled manually without the need for a PC.

FIG. 4 illustrates the system when used in accordance with a DC dimmable appliance/speed controllable motor/fan as well as a DC servo motor which holds the same speed characteristic except that the position of the servo motor can be tracked and the speed it moves is directly proportional to the position it is in and the position it needs to go to. First in examination is the servo motor control aspect of the system: PC 5A sends it signal to the relay/switching electronics with integrated controller 7A, which then in turn sends signals down to the servo motor through a 3 line cable (s-video) 7F. The servo motor 8A is of the type that can be powered by the 5-6 V DC current sent from the USB cable #1 5C. In the event that the PC or USB controller fails, the servo 8A can still be controlled by the Inline AA battery pack controller with dial 8B. In this scenario, the servo motor 8A can be optionally controlled manual without the need for a PC.

Finally, we will examine the same DC speed controlled scenario of the system when using a DC dimmable appliance/speed controllable motor/fan 9A. As before, PC 5A connects to the controller 5E via USB cable #2 5H and on through to the relay/switching electronics 7A in the same manner as FIG. 3. Power for the DC dimmable appliance/speed controllable motor/fan 9A is first passed through the relay/switching electronics 7A from the battery. A speed/dim controllable PWM signal is passed down to the DC dimmable appliance/speed controllable motor/fan 9A from the relay/switching electronics 7A, through an S-video cable 9C, allowing it to be speed/dimmable from 0-100 power.

In the event that the PC or USB Controller fails, the relay/switching electronics 7A can still be used to control the DC dimmable appliance/speed controllable motor/fan 9A from the manual inline dial 9B. The manual inline dial 9B has its own 5V battery power supply, and supplies the 5V PWM signal in the absence of a PC or USB controller. In this scenario, the DC dimmable appliance/speed controllable motor/fan 9A can be optionally speed/dim controlled manually without the need for a PC.

Referring now to FIG. 5 in a system using its external inputs. The external inputs represent and external control data signal that can be used to control interactivity with the system by allowing a user to control the system through a PC, but not using PC input devices. Non PC input devices 10A, can include, motion sensors, pressure mats, sliders, dials, ID tags and more. Non PC input devices can attach to the system using RCA composite video cable connections. These external inputs can only be connected to the system's controller 5E, but once connection is made, software will allow the non PC input devices 10A to act as a sensor or triggers in controlling all scenarios outlined in FIG. 1-4. Any commercial sensor can be used if wired with an RCA (composite plug) this feature of the invention allows for it to be universal in aspect of input choices as well. The non PC input support 10A is a very important aspect of the system because it allows the users to customized the system in a way that a trigger from one of the non PC input devices 10A can control one or even multiple outlet/channels connected to various AC or DC appliance/emitter devices 10B. Configuration here is changeable in software. Power can be AC or DC by connection to the outlet or battery. This diagram is showing that it can be either AC or DC depending on the appliance 10B used.

The invention claimed is:

1. A universal control system with universal interface to operate at least one appliance in the entertainment field, said system including a personal computer, said personal computer being programmed to provide for initiating the operations of a sequence of operations upon said at least one appliance, said appliance including one of a mister, dimmer, scent delivering apparatus, and a vibratory motor for use in said entertainment field, a relay switching electronic means with integrated controller operatively connected with the said personal computer, and said relay/switching controller electrically connected with an AC type operated appliance, a main source of electrical energy electrically connected with the personal computer, the relay/switching means, and the said appliance, and which when initiated, the personal computer being programmed to provide for selective functioning of a mister, dimmer, scent delivering apparatus, and vibratory motor, a backup AC source connected to the system and alternatively provided for operations of the relay/switching means and controller, and with the personal computer, to provide electrical means to operate said selected appliances in the event of a main electrical source failure.

2. The universal control system of claim 1 wherein the appliance is electrically operative through direct current, a rectifier providing for converting the alternating current to direct current, and a manual inline switch providing for the operations of the rectifier to provide for the conduct of direct current to the operating appliance.

3. The universal control system of claim 1 and wherein said appliance may additionally include a videogame.

4. The universal control system of claim 1 wherein the appliance is an emitting device regulated by said controller and initiated through the operations of the relay/switching means.

5. A universal control system with universal interface to operate at least one appliance in the entertainment field, said system including a personal computer, said personal computer being programmed to provide for initiating the operation of a sequence of operations upon said at least one appliance, said appliance including one of a mister, dimmer, scent delivering apparatus, and a vibratory motor for use in said entertainment field, a relay switching electronic means with integrated controller operatively connected with said personal computer, and said relay/switching controller electrically connecting with a DC type operated appliance, a source of DC electrical energy electrically connected with said personal computer, the relay/switching means, and said appliance, and which when initiated, the personal computer being programmed to provide for selective functioning of said mister, dimmer, scent delivering apparatus, and said vibratory motor, a backup DC source connected to the system and electrically connected to the relay/switching means and controller, and with the personal computer, to provide electrical energy to operate said selected appliance in the event of a main electrical source failure.

6. The universal control system of claim 5 wherein the appliance is a DC operative servo motor.

7. The universal control system of claim 5 wherein said main source of electrical energy is a battery.

\* \* \* \* \*